(12) United States Patent
Larson et al.

(10) Patent No.: US 10,518,704 B2
(45) Date of Patent: Dec. 31, 2019

(54) INTERIOR REARVIEW MIRROR ASSEMBLY WITH FULL SCREEN VIDEO DISPLAY

(71) Applicant: MAGNA MIRRORS OF AMERICA, INC., Holland, MI (US)

(72) Inventors: Mark L. Larson, Grand Haven, MI (US); John T. Uken, Jenison, MI (US); Christopher R. Koetje, Zeeland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 16/059,519

(22) Filed: Aug. 9, 2018

(65) Prior Publication Data
US 2018/0370440 A1 Dec. 27, 2018

Related U.S. Application Data

(63) Continuation of application No. 15/192,302, filed on Jun. 24, 2016, now Pat. No. 10,046,706.

(60) Provisional application No. 62/237,716, filed on Oct. 6, 2015, provisional application No. 62/185,206, filed on Jun. 26, 2015.

(51) Int. Cl.
*H04N 7/18* (2006.01)
*B60R 1/12* (2006.01)
*B60R 1/04* (2006.01)

(52) U.S. Cl.
CPC .................. *B60R 1/12* (2013.01); *B60R 1/04* (2013.01); *B60R 2001/1223* (2013.01); *B60R 2001/1253* (2013.01); *H04N 7/181* (2013.01)

(58) Field of Classification Search
CPC ...................................................... H04N 7/181
USPC ............................................................ 348/148
See application file for complete search history.

(56) References Cited

U.S. PATENT DOCUMENTS

| | | | |
|---|---|---|---|
| 4,793,690 A | 12/1988 | Gahan et al. |
| 5,193,029 A | 3/1993 | Schofield et al. |
| 5,285,060 A | 2/1994 | Larson et al. |
| 5,416,313 A | 5/1995 | Larson et al. |
| 5,530,240 A | 6/1996 | Larson et al. |
| 5,550,677 A | 8/1996 | Schofield et al. |
| 5,668,663 A | 9/1997 | Varaprasad et al. |
| 5,670,935 A | 9/1997 | Schofield et al. |
| 5,715,093 A | 2/1998 | Schierbeek et al. |

(Continued)

*Primary Examiner* — Michael Lee
(74) *Attorney, Agent, or Firm* — Honigman LLP

(57) ABSTRACT

A vehicular interior rearview mirror assembly includes a mirror head pivotable about a mirror support. An electro-optic mirror reflective element includes a transflective mirror reflector that at least partially reflects light incident thereon and at least partially transmits incident light therethrough. A video display device is disposed rearward of a reflective region of the mirror reflective element and includes a display screen that occupies at least 75 percent of the reflective region. A light sensor is disposed at an overhang region and is integrated with a user input that is configured to actuate at the overhang region of the mirror reflective element. The video display device is operated responsive at least in part to actuation by a user of the user input. Electro-optic dimming of the mirror reflective element and/or display intensity of the video display device is variable responsive to a light level detected by the light sensor.

20 Claims, 14 Drawing Sheets

(56) References Cited

U.S. PATENT DOCUMENTS

| | | |
|---|---|---|
| 5,724,187 A | 3/1998 | Varaprasad et al. |
| 5,760,962 A | 6/1998 | Schofield et al. |
| 5,796,094 A | 8/1998 | Schofield et al. |
| 5,877,897 A | 3/1999 | Schofield et al. |
| 6,097,023 A | 8/2000 | Schofield et al. |
| 6,201,642 B1 | 3/2001 | Bos |
| 6,222,447 B1 | 4/2001 | Schofield et al. |
| 6,320,176 B1 | 11/2001 | Schofield et al. |
| 6,329,925 B1 | 12/2001 | Skiver et al. |
| 6,396,397 B1 | 5/2002 | Bos et al. |
| 6,420,975 B1 | 7/2002 | DeLine et al. |
| 6,428,172 B1 | 8/2002 | Hutzel et al. |
| 6,498,620 B2 | 12/2002 | Schofield et al. |
| 6,559,435 B2 | 5/2003 | Schofield et al. |
| 6,590,719 B2 | 7/2003 | Bos |
| 6,690,268 B2 | 2/2004 | Schofield et al. |
| 6,717,610 B1 | 4/2004 | Bos et al. |
| 6,757,109 B2 | 6/2004 | Bos |
| 6,806,452 B2 | 10/2004 | Bos et al. |
| 6,822,563 B2 | 11/2004 | Bos et al. |
| 6,831,261 B2 | 12/2004 | Schofield et al. |
| 6,902,284 B2 | 6/2005 | Hutzel et al. |
| 6,922,292 B2 | 7/2005 | Bos |
| 6,946,978 B2 | 9/2005 | Schofield |
| 7,004,606 B2 | 2/2006 | Schofield |
| 7,038,577 B2 | 5/2006 | Pawlicki et al. |
| 7,046,448 B2 | 5/2006 | Burgner |
| 7,184,190 B2 | 2/2007 | McCabe et al. |
| 7,195,381 B2 | 3/2007 | Lynam et al. |
| 7,255,451 B2 | 8/2007 | McCabe et al. |
| 7,274,501 B2 | 9/2007 | McCabe et al. |
| 7,338,177 B2 | 3/2008 | Lynam |
| 7,370,983 B2 | 5/2008 | DeWind et al. |
| 7,720,580 B2 | 5/2010 | Higgins-Luthman |
| 7,734,392 B2 | 6/2010 | Schofield et al. |
| 7,855,755 B2 | 12/2010 | Weller et al. |
| 8,154,418 B2 | 4/2012 | Peterson et al. |
| 8,446,470 B2 | 5/2013 | Lu et al. |
| 8,451,107 B2 | 5/2013 | Lu et al. |
| 8,730,553 B2 | 5/2014 | De Wind et al. |
| 8,890,955 B2 | 11/2014 | Peterson |
| 9,057,875 B2 | 6/2015 | Fish, Jr. et al. |
| 9,205,780 B2 | 12/2015 | Habibi et al. |
| 9,346,403 B2 | 5/2016 | Uken et al. |
| 9,598,016 B2 | 3/2017 | Blank et al. |
| 10,046,706 B2 | 8/2018 | Larson et al. |
| 2006/0050018 A1 | 3/2006 | Hutzel et al. |
| 2006/0171704 A1 | 8/2006 | Bingle et al. |
| 2009/0015736 A1 | 1/2009 | Weller et al. |
| 2009/0161241 A1 | 6/2009 | Wang et al. |
| 2009/0167670 A1 | 7/2009 | Peng et al. |
| 2009/0244361 A1 | 10/2009 | Gebauer et al. |
| 2010/0097469 A1 | 4/2010 | Blank et al. |
| 2010/0165437 A1 | 7/2010 | Tonar et al. |
| 2010/0201816 A1 | 8/2010 | Lee et al. |
| 2010/0214791 A1 | 8/2010 | Schofield |
| 2011/0084990 A1* | 4/2011 | An .................. G09G 3/3648 345/690 |
| 2014/0022390 A1* | 1/2014 | Blank .................. B60R 1/12 348/148 |
| 2014/0347488 A1 | 11/2014 | Tazaki et al. |
| 2015/0175075 A1* | 6/2015 | Baumann .................. B60R 1/08 359/275 |

\* cited by examiner

Plurality of backlight "Zones" which can be controlled for intensity
Each zone can be controlled individually or as part of a group At least 2 zones, and as many as 128 zones could be implemented.
"Groups" of Zones may be either fixed, or dynamically defined by software.

INTERIOR REARVIEW MIRROR ASSEMBLY WITH FULL SCREEN VIDEO DISPLAY

CROSS REFERENCE TO RELATED APPLICATIONS

The present application is a continuation of Ser. No. 15/192,302, filed Jun. 24, 2016, now U.S. Pat. No. 10,046,706, which claims the filing benefits of U.S. provisional applications, Ser. No. 62/237,716, filed Oct. 6, 2015, and Ser. No. 62/185,206, filed Jun. 26, 2015, which are hereby incorporated herein by reference in their entireties.

FIELD OF THE INVENTION

The present invention relates generally to the field of interior rearview mirror assemblies for vehicles and, more particularly, to interior rearview mirror assemblies with a display.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element. It is also generally known to provide a display screen at the mirror assembly.

SUMMARY OF THE INVENTION

The present invention provides an interior rearview mirror assembly that includes a mirror casing, an electro-optic mirror reflective element and a display device disposed behind the electro-optic mirror reflective element and operable to display information for viewing by the driver of the vehicle through the mirror reflective element. The electro-optic mirror reflective element comprises a transflective mirror reflector whereby the mirror reflector reflects light that is incident on the electro-optic element and partially transmits illumination emitted from the display device through the electro-optic mirror reflective element. The display screen or display area of the display device generally encompasses or spans the height and width of the mirror reflective element and may occupy at least 75 percent of the electro-optically active reflective area of the mirror reflective element.

Optionally, the display device of the interior review mirror assembly may include an LCD panel that has an LED backlight with at least two operating ranges configured to reduce the illumination intensity of the LED backlight during sensed night-time driving conditions and increase illumination intensity of the LED backlight during sensed daytime driving conditions. The LED backlight may include at least two zones that are configured to be independently controlled based on content of an image displayed by the display device.

These and other objects, advantages, purposes and features of the present invention will become apparent upon review of the following specification in conjunction with the drawings.

DESCRIPTION OF THE PREFERRED EMBODIMENTS

Figure 1:
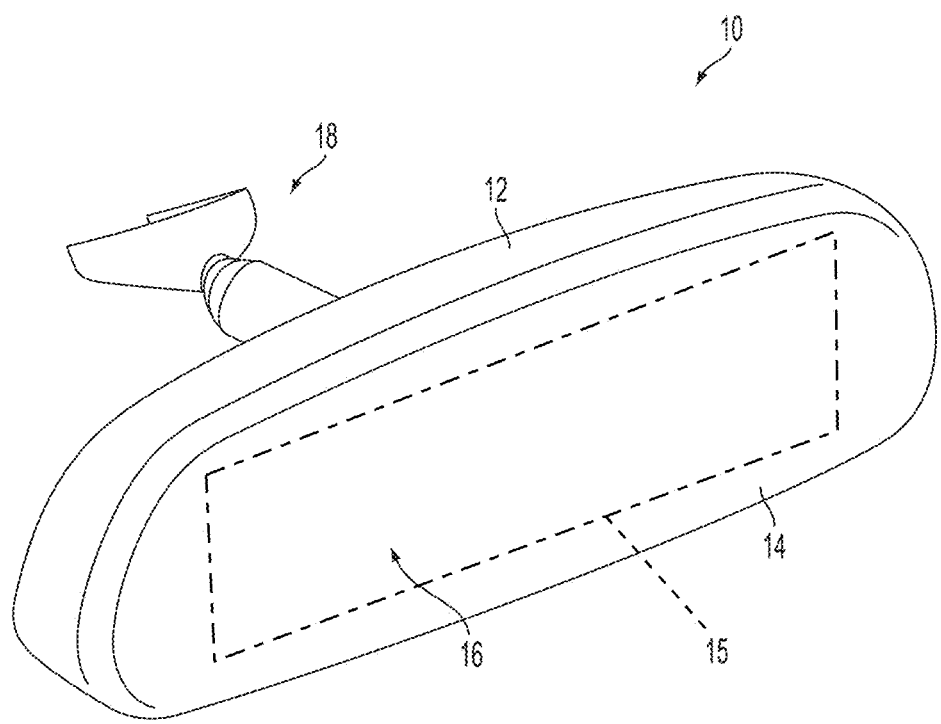
FIG. 1 is a perspective view of an interior rearview mirror assembly in accordance with the present invention.
Figure 2:
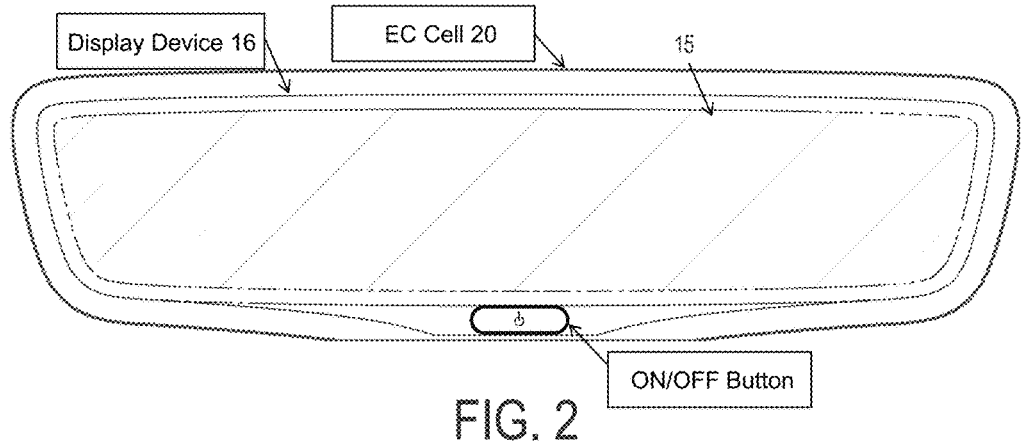
FIG. 2 is a front elevation view of an interior rearview mirror assembly in accordance with the present invention.

Referring now to the drawings and the illustrative embodiments depicted therein, an interior rearview mirror assembly 10 for a vehicle includes a casing 12 that houses a reflective element 14 and a display device 16, which provides a display area 15 visible to the driver of the vehicle through the reflective element 14 (FIGS. 1 and 2). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 18. The casing 12 of the interior rearview mirror assembly 10 may house all or a portion of the components of the interior rearview mirror assembly 10 and may be integrally formed with portions thereof.

Figure 2A:
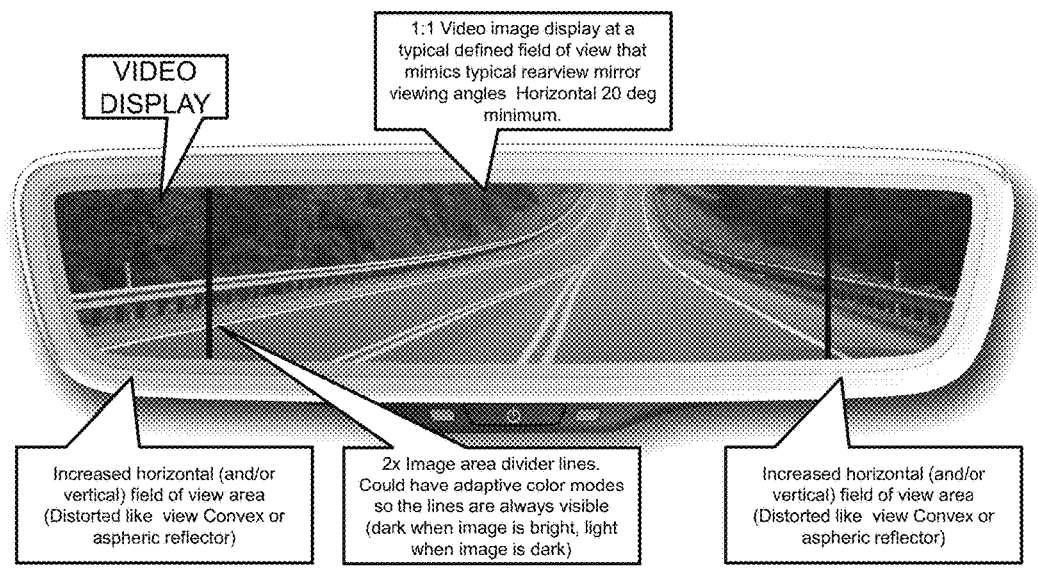
FIG. 2A is another front elevation view of an interior rearview mirror assembly in accordance with the present invention.

As shown in FIG. 2A, the principal or main viewing area of the full display video mirror has the same or slightly better field of view of a typical rearview mirror (minimum of about 20 degrees). This image could be 1:1 scale of what a reflected image would be. The left and right end zones may be delineated by a divider overlay image. Those end zones would display a distorted image so that a greater horizontal and/or vertical field of view can be seen. This would be similar to a convex or aspheric or "flat to bent" reflector. This could be tuned to reduce/eliminate blind zones between the exterior rearview mirror view and the interior rearview mirror view. Also, those end zones could have different display modes, such as, for example, a "trailering mode" or the like, where the zones could potentially show the edges of the road (with overlay of car edges or actual edges) so at a glance the driver can see how the equipped vehicle is centered in the lane. The display may include a "1:1 mode" that would turn off the dividers if that is annoying to some drivers.

Figure 3:
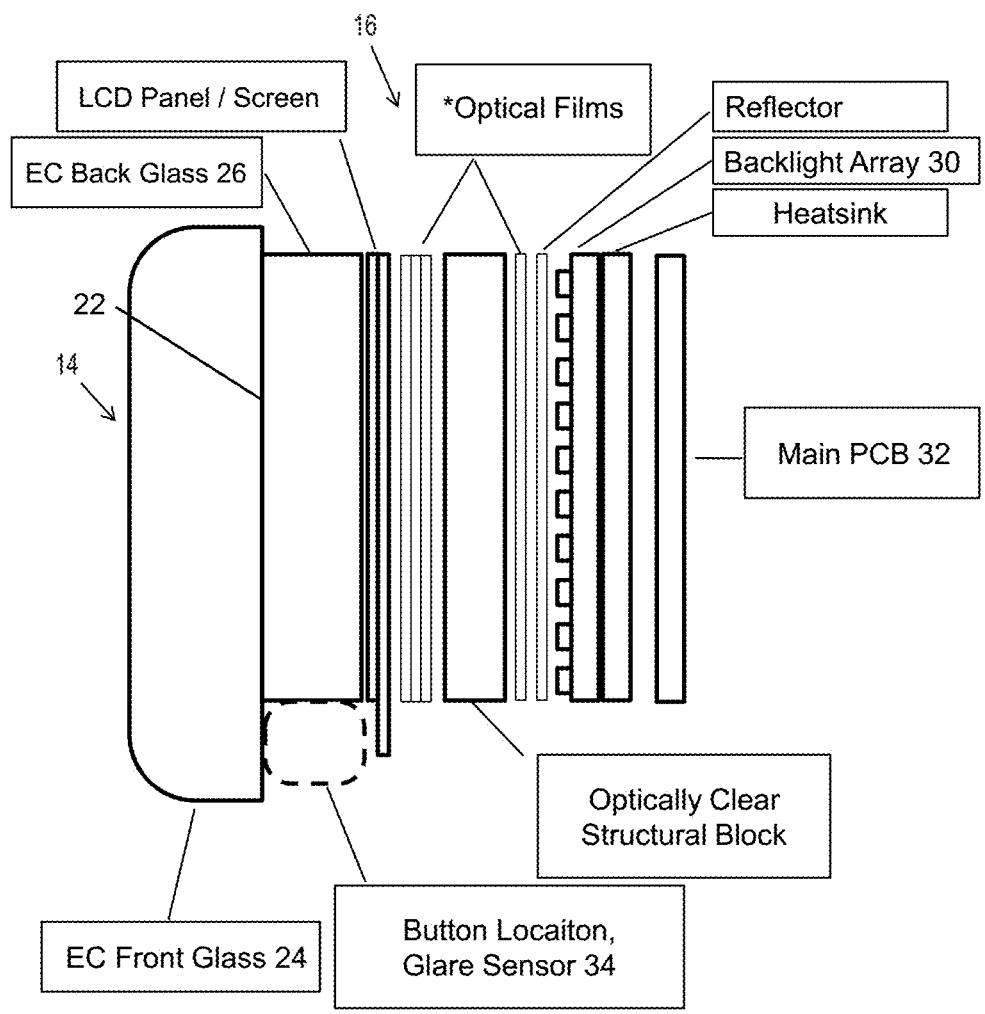
FIG. 3 is a sectional view of an interior rearview mirror assembly in accordance with the present invention.

The mirror reflective element 14 of the interior rearview mirror assembly 10 comprises an electro-optic mirror reflective and the display device 16 is disposed at a rear surface of the electro-optic mirror reflective element for emitting illumination and displaying images and/or other information at the display area 15 (FIGS. 1-3). In the illustrated embodiment of FIG. 2, the display area 15 encompasses substantially all of the reflective element 14, such that the display area 15 is substantially the same size as the visible reflective surface. For example, the display area 15 may occupy at least 75 percent of the area of the visible reflective surface of the reflective element (or the electro-optically active region of the reflective element), preferably at least 85 percent of the area of the visible reflective surface of the reflective element, and more preferably at least 95 percent of the area of the visible reflective surface of the reflective element. The display device 16 is disposed at the rear surface of the electro-optic mirror reflective element 14, with a mirror reflector film or layer 22 disposed at the front surface of the rear substrate (commonly referred to as the third surface of the reflective element) and opposing an electro-optic medium, such as an electrochromic medium disposed between the front and rear substrates and bounded by a perimeter seal. Optionally, the mirror reflector could be disposed at the rear surface of the rear substrate (commonly referred to as the fourth surface of the reflective element), while remaining within the spirit and scope of the present invention.

The mirror reflector 22 comprises a transflective mirror reflector and provides a substantially reflective layer at the display area 15, while being at least partially transmissive of light or illumination emitted by display device 16, as discussed below. The transflective mirror reflector 22 is partially transmissive of visible light therethrough and partially reflective of visible light incident thereon and, thus, the presence of the video display device behind the reflective element is rendered covert by the transflective mirror reflector and information displayed by the video display device is only viewable through the mirror reflector and reflective element when the video display device is activated or backlit to display such images and/or information for viewing by the driver of the vehicle when the driver is normally operating the vehicle.

In the illustrated embodiment, the electro-optic mirror reflective element 14 of the interior rearview mirror assembly 10 includes a front substrate 24 and a rear substrate 26 spaced from front substrate 24 with the electro-optic medium (such as an electrochromic medium) and transparent conductive or semi-conductive layers (such as described below) sandwiched between the substrates 24, 26 (with the transparent conductive layer disposed at a rear surface of front substrate 24 [the second surface of the laminate electro-optical element] and the transparent conductive layer disposed at the front surface of rear substrate 26 [the third surface of the laminate electro-optical element]). For example, the conductive layers may comprise an indium tin oxide (ITO) material or a thin metallic layer sandwiched between two transparent conductive layers (a TC/M/TC stack of layers) such as ITO/Metal/ITO (for example, ITO/Ag/ITO) or a doped tin oxide or a doped zinc oxide or the like, so as to provide the desired conductivity and transparency at the second and third surfaces of the fourth surface reflector reflective element or cell. An electrical sheet resistance of less than about 20 ohms/square is preferred for such transparent conductor layers; more preferably less than about 15 ohms/square and most preferably less than about 10 ohms/square, while visible light transmission through such transparent conductive coated substrates is preferably at least about 70% T, more preferable at least about 75% T and most preferably is at least about 80% T. An epoxy seal material or the like is applied between the substrates to define the cavity for the electrochromic medium and to adhere the substrates together.

The display device is operable to display video images captured by a rearward viewing camera, such as a camera mounted at a rear portion of the vehicle or that views through a rear window of the vehicle so as to have a rearward field of view rearward and at least partially sideward of the vehicle. The camera may capture images during normal operation of the vehicle, such as when the driver of the vehicle drives the vehicle forwardly along a road. Video images are displayed by the display device during such normal operation, such as to provide enhanced rearward viewing that encompasses regions not viewable to a driver of a vehicle viewing a conventional interior rearview mirror assembly.

In the illustrated embodiment, and as shown in FIG. 3, the display device 16 comprises a display module having a display screen (such as a multi-pixel LCD panel/screen backlit by a plurality of LEDs) and a circuit element 32 (such as a printed circuit board or the like, such as a silicon substrate having circuitry established thereon) disposed at the rear of the display screen. Circuit board 32 has circuitry established thereat (such as by establishing the circuitry at or on a silicon substrate using CMOS technology or the like), and such circuitry may be configured for controlling the display functions and for controlling the dimming or variable reflectance of the reflective element. The circuit board 32 may also be coupled with a photo/glare light sensor 34 established rearward of the display device for providing a viewing angle capable to sensing glare on the display area, such as in a location rearward of the display screen and forward (as in forward with respect to the direction of the travel of the vehicle) of the front glass substrate 24 for detecting or sensing the light (such as ambient light or glare light) at the mirror reflective element and the display device 16. As shown in FIG. 3, the sensor 34 may be disposed behind the front substrate (such as at an overhang region where the cross dimension of the front substrate is greater than the cross dimension of the rear substrate), so that the sensor is not behind the display screen or the electro-optic (such as electrochromic) medium.

The glare light sensor 34, as shown in FIGS. 2 and 3, may be integrated with an ON/OFF user input or touch sensor behind the front glass substrate 24 that is configured to actuate based on a touch event at an exterior surface of the electro-optic mirror reflective element. This integration reduces the overall dimensions of the mirror and optimizes light sensor position, namely, it places the light sensor closer to the first surface of front substrate of the reflective element, which allows for a wider viewing angle. Such a sensor 34 may also be positioned at alternative locations and may also be used to sense night-time driving conditions of the vehicle, such as relative light conditions, headlights, and other conditions indicative of night-time driving. For instance, the glare light sensor may be integrated above the plane of the backlit thin film transistor (TFT)—LCD display screen or panel. With respect to the user input integrated with the sensor, the input or sensor may provide capacitive or optical detection of a finger, may include light management films to prevent backlight from affecting the sensor, and may include color applique, printed, or laser etched graphics. The user input or sensor and mirror assembly may utilize aspects of the sensors and mirror assemblies described in U.S. Pat. No. 8,154,418 and/or International Publication Nos. WO 2011/044312; WO 2012/051500 and/or WO 2013/071070, which are all hereby incorporated herein by reference in their entireties.

With further reference to the construction of the display device 16, as show for example in FIG. 3, optical films and an optically clear structural block may be provided between the display panel or screen and the backlight array 30 of the display device 16. These optical films may include DBEF, BEF-1, BEF-2, Diffusers (2+), such as brightness enhancement films (such as, for example, Vikuiti™ BEF films from 3M) and a light diffuser sheet (such as, for example, a hazed or diffuse-light transmitting plastic diffuser or sheet). A reflector (such as a metal or metal coated reflector) may be disposed behind the backlight array to enhance backlighting of the display screen. For example, the optical films may comprise visible light transflecting/polarizing elements or films (such as Vikuiti™ Dual Brightness Enhancement Film-Polarizer (DBEF-P2) film available from 3M).

A backlight array 30 (such as a two dimensional array of white light emitting LEDs or the like) may also be provided to generate enhanced backlighting intensity to further help ensure that the driver can discern any video image or information being displayed and transmitted through the electro-optic element 20, as sunlight streaming into the vehicle cabin and incident at the display area of the interior mirror reflective element may cause reflective glare and/or wash-out the video image or other displayed information. To provide sufficient image clarity, the video display device may include the backlighting element 30 that is configured to provide increased image brightness. The video display screen element is disposed at the rear surface of the electro-optic mirror reflective element 14. The backlighting element is disposed to the rear of the video screen so that visible (or other) light emitted from the backlighting element (when it is electrically powered) passes through the video screen element.

The display device 16, such as shown in FIG. 3, is disposed behind the reflective element 14 and is operable to display images and information for viewing by the driver of the vehicle through the transflective mirror reflector coating 22. The display area of the display screen is sized to substantially encompass the electro-optically active region (the region bounded by the perimeter seal) of the mirror reflective element. The display device 16 may comprise any suitable display device, such as a video display device, and such as a multi-pixel display screen (such as a backlit dot matrix liquid crystal display or a thin film transistor or TFT display screen) that is backlit by a plurality of illumination sources 30, such as a plurality of white light-emitting light emitting diodes or the like. The display device may utilize aspects of the display-on-demand transflective type displays and/or video displays or display screens of the types disclosed in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736 and/or US-2010-0097469, which are all hereby incorporated herein by reference in their entireties.

For such a full-screen video mirror, night-time driving may result in increased glare from head-lights reflected off the mirror or glass surfaces at the display area. To resolve that issue, the electro-optic mirror reflective element 14 may be dimmed or darkened while the display device 16 is active during night-time conditions, which reduces reflection from the mirror reflector. Doing so may also result in the need to change the neutral color of the TFT panel, which is normally white in color, to more of a pink color to compensate for the blue-green color of the images displayed through the active, darkened electro-optic medium of the mirror reflective element 14. Accordingly, the display device 16 may function to adjust the neutral color emitted based on the actuation condition of the electro-optic element. Also, in order to reduce issues related to glare from head-lights reflected off the mirror or glass surfaces, which are common during night-time driving, the video signal processing may be adapted to increase overall background image luminance (i.e., over-power reflection by modifying the video brightness). For example, the backlight intensity may be modified or increased to over-power the reflected images, so that the displayed images can be viewed by the driver. Alternatively or in addition, the content of the displayed image may be modified, such that dark areas of the image are increased in brightness.

Optionally, the control of the display device may provide an increased contrast ratio for enhanced or optimum night-time conditions. For example, the LED backlight may be operable in two or more different dimming ranges, such that the maximum display intensity is reduced during night-time (the nominal LED current is different in each range). This may limit or substantially preclude the backlighting from appearing gray during nighttime driving conditions, and this may limit or substantially preclude the backlight intensity from optically affecting the transistors within the LCD display panel. Optionally, the display may provide localized or regional dimming of the LED backlight based on video image's content. For example, because the sky during night-time conditions is black, the display (when displaying video images captured by a vehicle camera that has its field of view encompassing a region of the sky) may have that region of the backlight at that region of the displayed image be at a lower brightness. The dimming region could be static based on the camera/optics design, or may be dynamic based on the displayed video content.

Figure 7:
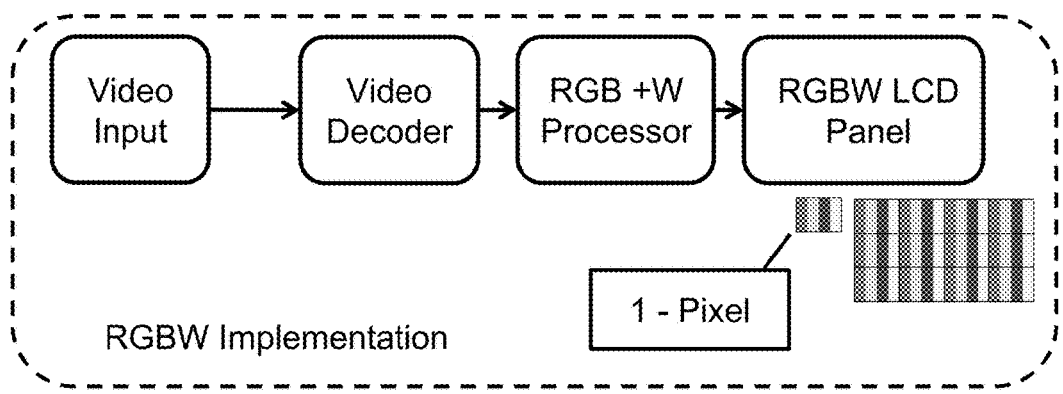
FIG. 7 is a schematic flow chart diagram showing a pixel arrangement for an LCD display device having a white pixel filter and R, G, B pixel filters in accordance the present invention.

Optionally, the display device and control thereof may provide increased intensity during daytime conditions. Typical displays use Red, Green, and Blue sub-pixels (or pixels of a sub-array comprising three or more pixels with respective spectral filters or elements). In order to increase the overall brightness of the displayed images, and such as shown in FIG. 7, the display device 16 of the present invention includes an additional "white" or clear sub-pixel within the pixel sub-arrays of the LCD panel, such that there are 4 sub-pixels or 4 pixels of each sub-array (a red sub-pixel, a green sub-pixel, a blue sub-pixel and a white/clear sub-pixel). Use of the white/clear sub-pixel increases the overall brightness of the displayed image. The white/clear pixel could be of the same dimensions as the R, G, B pixels, or slightly different dimensions to provide the desired lighting effect or to increase the effective brightness, depending on the particular application. Optionally, such a display device configured with white/clear pixels may be altered between emitting or displaying an image using the white/clear pixels and emitting or displaying an image without the white/clear pixels, such as when glare and/or night-time driving conditions are sensed. The sub-pixels are individually addressed to provide the desire color for each pixel of the display screen, and the white/clear sub-pixel may be addressed to allow more or less light to pass therethrough to brighten or darken the displayed images accordingly.

Also, since eyes can change peak color or wavelength sensitivity depending on the ambient lighting conditions, the display colors may be adjusted to match optimum sensitivity of the human eye with the current sensed ambient lighting conditions. For example, the video or image displayed by the display device 16 may be changed from a full-color image display to a black and white image during a sensed or otherwise determined night-time condition or other conditions, such as a sensed glare in the display area.

Optionally, the display device and control may adjust or change the video signal processing during nighttime or other conditions. The luminance or other video signal parameters of the display device may be adjusted to display a more usable image to the user. For example, the video signal processing may be changed during nighttime conditions. For example, in a dark lighting condition, the red color curve of the displayed image may be modified to make lighting from the vehicle's own brake lights less prominent or obvious to the driver viewing the displayed images. Video processing may also use the sum of the three RGB sub-pixels in order to yield a substantially brighter image.

In such dark lighting conditions, the video signal may be modified at the moment of brake light activation, to limit or substantially prevent flicker or glare from being perceived in the video display, which would need communication from the vehicle as to the brake-light status, such as via a CAN network. Responsive to a signal indicative of actuation of the brakes, the backlight intensity may be reduced or the luminance portion of the video signal may be reduced by changing the signal processing.

It is desirable that the display device 16 provides enhanced or substantial backlighting of the display screen to enhance the viewability of the display screen during high ambient lighting conditions. However, enhanced illumination typically results in increased operating temperatures of the display device due to the heat dissipation by the light sources of the rear backlighting, and, thus, is often challenging for applications within an enclosed structure such as a mirror casing. In the illustrated embodiment, in order to reduce the operating temperature at the display device 16, including heat generated from the backlight array 30, the mirror assembly may include one or more thermally conductive elements or heat dissipating elements or heatsinks to conduct/dissipate heat generated by the LCM display device 16. The heatsink may be an integral part of the backlighting LED array or may be a separate piece, and may be any thermally conductive material, such as a metal or alloy, shaped to have protrusions or fins that allow air circulation to further dissipate heat from the backlighting LED array. Optionally, the heatsink may comprise a polymer resin, with or without filler materials to increase thermal conductivity. For example, the heatsink may comprise materials of the types produced by Celanese under the trademark CoolPoly.

Figure 8:
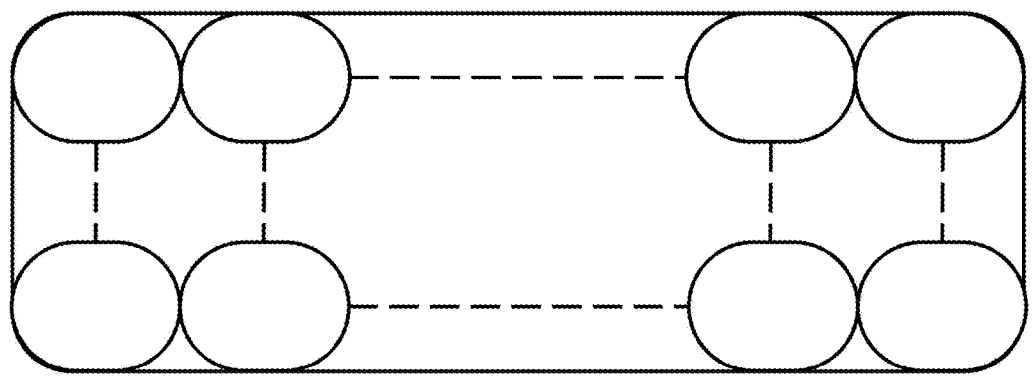
FIG. 8 is a schematic diagram of a display device for an interior rearview mirror assembly showing a plurality of backlight zones in accordance the present invention.

Optionally, and such as shown in FIGS. 3 and 8, the backlight array 30 may include a plurality of backlight zones which can be independently controlled for intensity (to individually or separately control the brightness or intensity of respective portions of the displayed images), and each zone (or even each individual LED) can be controlled individually or as part of a group or set of zones. The zones may comprise between 2 and 128 zones, and the zones may be further operated as groups of zones that are actuated together, where the groups may be fixed or dynamically defined with software. Software or dedicated hardware machines analyze each frame of video image data and control the individual LED intensities based on the ambient lighting environment as well as the spatial luminance within that particular frame. The LED backlight may include zones of individual LEDs or sets of LEDs or most preferably individually addressable LEDs that are configured to independently actuate and increase or decrease brightness based on the brightness and/or content of the images displayed by the display device. For example, each zone of LEDs may comprise multiple LEDs and preferably one LED, and the LEDs of each zone may be commonly powered to achieve a specific zone intensity.

Figure 4:
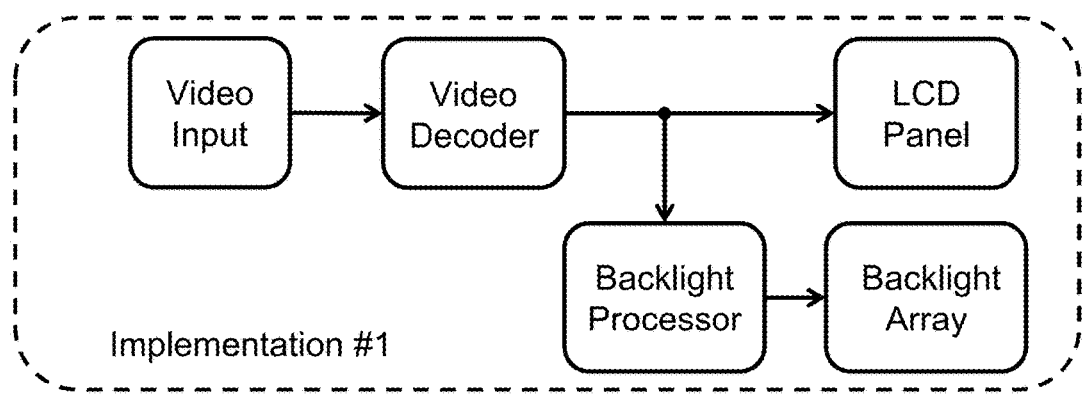
FIG. 4 is a schematic flow chart diagram showing backlight processing for a display device in accordance the present invention.
Figure 5:
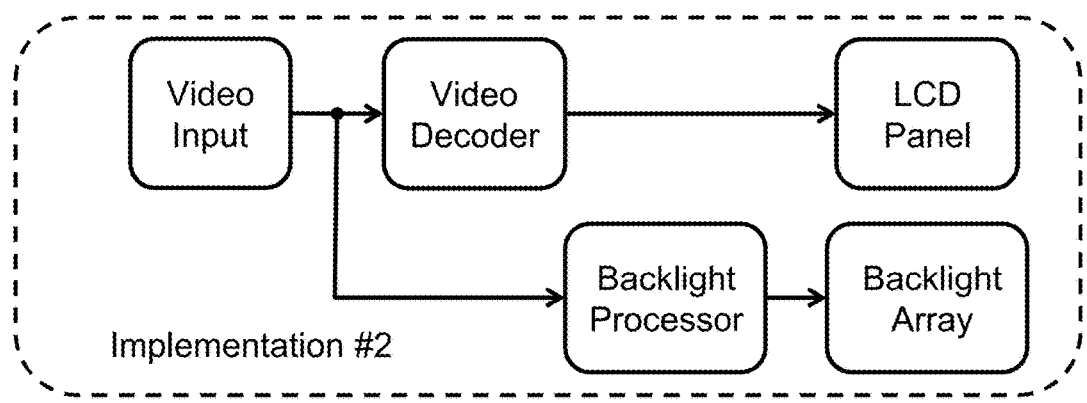
FIG. 5 is another schematic flow chart diagram showing backlight processing for a display device in accordance the present invention.
Figure 6:
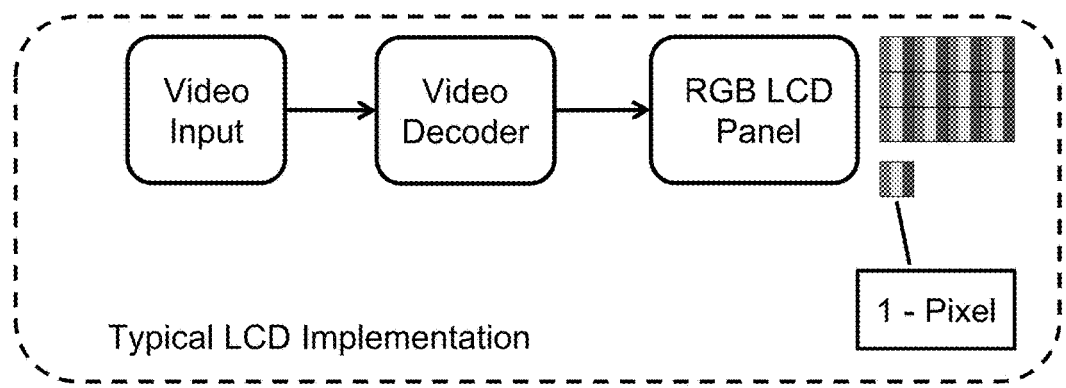
FIG. 6 is a schematic flow chart diagram showing three color pixel arrangement for an LCD display device.

As shown in FIGS. 4 and 5, the video input to be displayed on the LCD panel may be separately processed by a backlight processor to control the backlight array, such as with the zones, based on the image content of the video input. This processing may be selectively performed, but more preferably processed automatically using a combination of information such as user preference settings, ambient forward and/or rearward light sensors and most importantly the spatial luminance information within each frame of video. During nighttime driving conditions in very dark ambient lighting, the light leakage from the backlight through the TFT panel can cause irritation to a driver when his or her eyes are completely dark adapted. Such dimming could be configured to prevent the display from appearing gray during night conditions, allow selective brightening or even turn on only LEDs in areas where headlights are present. Such localized or regional dimming of the LED backlight is also applicable during higher ambient driving conditions. Each frame of video image data captured during daytime ambient conditions has varying spatial requirements for backlight intensity. By only driving bright spatial regions with bright backlight intensities, significant power can be saved in the backlight. In addition, the contrast and color quality of individual frames can be dynamically and continuously optimized to only use peak LED power where it is absolutely needed. During daytime conditions, it is common for most images to have bright sky regions in the upper half of an image and darker ground or foliage content in the lower half of the displayed images. LEDs in the sky region or upper region would be driven with a higher current or higher PWM duty cycle than those LEDs in the darker ground and foliage regions of the display. Power savings in the backlight current budget can be realized under most daytime and nighttime video frames. There will be unique situations such as sunny days where the landscape is snow covered under which power savings may be minimal.

It is preferable to have individual light emitting diodes independently controlled based on determined display intensities of respective portions of the video images displayed by the video display device. For example, the particular zones of backlighting LEDs to be increased or decreased in intensity may be determined responsive to processing of image data representative of the displayed images, such as to determine glare regions or bright spots (or dark spots) in the images, whereby the backlighting zones associated with the glare regions or bright spots may have the LED intensity increased and/or the backlighting zones associated with dark areas may have the LED intensity decreased. For example, at least one zone of the plurality of zones of light emitting diodes may be brightened responsive to a determination of a glare source, such as a headlight of a rear-approaching vehicle or a glare or reflection of light off of a windshield of a rear-approaching vehicle or the like, being present in the rearward field of view of said rearward viewing camera. Also, for example, at least one zone of the plurality of zones of light emitting diodes may be darkened (or have its intensity decreased) responsive to a determination of a darker region, such as a shaded region or shadow or the like, being present in the rearward field of view of the rearward viewing camera, particularly during daytime driving conditions where the other regions of the captured images are brighter. The goal of localized intensity control of LEDs is to always attempt to use the lowest possible luminance output for that particular lighting environment and spatial content of the video image that that particular LED can influence.

The display system thus determines brighter regions (such as headlights or the like) and darker regions (such as sky at night or shadows or the like) and accordingly adjusts the backlighting of the display regions on a frame-by-frame basis. Additionally, the display system may make frame by frame modifications to the spatial video signal being written to the pixels of the display in order to compensate for luminance gradient that each LED influences in the LCD. One LED may illuminate a 1 cm region of display surface with the pixels directly adjacent to the LED being illuminated with more energy than the pixels on the perimeter of the LEDs influence region. The video signal around luminance transition regions may need to be enhanced in software to intentionally increase or decrease the video signal itself to compensate for the gradient caused by individual LEDs. When the local dimming of the backlight and the enhancement to the video signal are optimized to work together the result is to provide sharp, uniform and natural gradients in luminance transitions, while reducing overall backlighting of the display screen to conserve power. For example, in order to provide enhanced sharp display of a headlamp (or other light source) at night, the LED or LEDs (or zone of LEDs) at the region displaying the headlamp may be adjusted to provide a desired brightness and simultaneously the video signal supplied to display pixels surrounding the headlamp may also be adjusted or dimmed so as to compensate for the gradient glow surrounding the headlight LEDs. The displayed image has a sharper and natural contrast between the displayed headlamp and its darker surroundings (thus reducing any glow or halo around the displayed headlamp). The processing of the captured image data and such adjustments of the backlighting and the of the display screen are made on a frame-by-frame basis such that the displayed images are adjusted for enhanced/optimized display and viewing, while at the same time conserving power in the display system. The goal of the "local dimming concept" is to first save power and to do this by minimizing the intensity in dark areas and only using bright intensity in bright areas. Local dimming thus saves power and at the same time can enhance the appearance of some video content (such as by increasing shadow areas to enhance viewing of those areas and/or by darkening darker areas to achieve better contrast).

Figure 9:
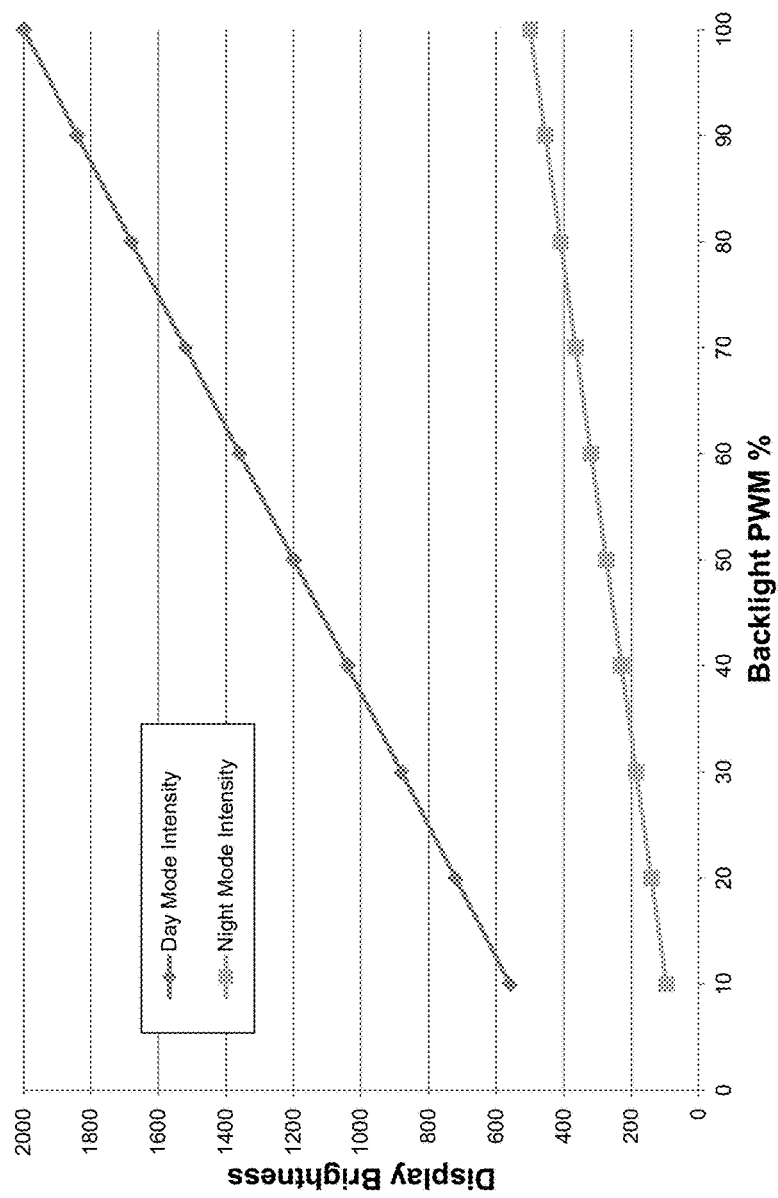
FIG. 9 is a graph of backlight display brightness for day mode intensity and night mode intensity for display device of the present invention.

Further, and such as shown in FIGS. 3 and 8, the display device may include an LCD panel that has an LED backlight array with at least two dimming ranges configured to reduce illumination intensity of the LED backlight during the sensed night-time driving conditions, such that maximum intensity is reduced during night-time. For example, and such as illustrated in FIG. 9, a day mode intensity and a night mode intensity may be separately defined and have separate brightness level changes with different pulse width modulation (PWM) percentages, thereby allowing brightness to be reduced at different levels when switching from day mode to night mode. Accordingly, the illumination source(s) of the backlight array 30 may comprise one or more light emitting diodes (LEDs) (such as a plurality of LEDs, such as high intensity LEDs of the types described in U.S. Pat. No. 7,195,381, which is hereby incorporated herein by reference in its entirety), or may comprise cold-cathode fluorescent sources, laser diode sources, electroluminescent sources, or the like, and may be electrically activatable or operable or energizable to backlight or illuminate the display screen.

For a thin film transistor (TFT) liquid crystal display (LCD) video display element or other display types, the desired degree of luminance may be achieved by, but is not limited to, cold cathode fluorescent tubes, white LEDs, or white light generated through color mixing of red, green, and blue LEDs, or other suitable illumination sources or elements, located at the TFT LCD display element behind the reflector/reflective element, as shown in FIG. 3.

The innovations of the present invention may also be used in video mirrors such as those described in U.S. Pat. No. 9,057,875 to Fish Jr., et al. titled "Display Mirror Assembly," which issued Jun. 16, 2015, and in U.S. Publication No. US-2014-0347488 (filed as U.S. patent application Ser. No. 14/358,192 on Oct. 29, 2012) and titled "Video display mirror and video display mirror system", the disclosures of which are hereby incorporated by reference herein in their entireties. In such video mirrors that utilize a full-screen or near full-screen video display, an actuator device is adjustable to tilt a mirrored glass element in one direction, thereby moving the mirrored glass element to an off-axis position which approximately simultaneously changes the on/off state of a video display module. The actuator device is also adjustable to tilt the glass element in another direction, thereby moving the glass element to an on-axis position which approximately simultaneously changes the on/off state of the display module. The mirror assembly and display and adjustment may utilize aspects of the mirror assemblies described in U.S. Pat. No. 9,205,780, which is hereby incorporated herein by reference in its entirety.

The video display mirror can be provided with a transflective mirror element, a video display module and an interlocking mechanism. The transflective mirror element can be used so that a vehicle driver can look towards the rear of the vehicle by viewing an interior mirror assembly that comprises the transflective mirror element. The video display module is disposed near and behind the transflective mirror element in the interior mirror assembly at the windshield of the equipped vehicle. The interlocking mechanism moves to result in the video images (such as captured by and fed from a rear-viewing video camera or set of video cameras of the equipped vehicle) being displayed on a video screen of the video display module and changes the angle of a reflection surface of the transflective mirror element from the position of the transflective mirror element when the rear of the vehicle is viewed.

The actuator can be a manually operated and manually-powered toggle mechanism, or may be manually operated but with a motor-powered toggle mechanism. Optionally and preferably, such toggling or tilting or moving of such full display hybrid video mirrors from one state (where a video captured by at least one video camera of the equipped vehicle is displayed by the video screen of the video display module for viewing by the driver as he or she operates and drives the equipped vehicle) to a second state (where a video captured by at least one video camera of the equipped vehicle is not displayed by the video screen of the video display module for viewing by the driver and where the driver views rearward via a mirror reflector of the transflective mirror element) is hands-free and is achieved by at least one of (i) voice control/voice command and (ii) gesture control/gesture command. Alternatively or additionally, touch sensing/touch control can be used.

Since the camera may optionally be mounted on movable portions of the vehicle, such as the rear window or trunk lid or lift gate, the display may optionally be disabled when the camera is not pointed in the designed or selected or intended direction. The vehicle can command the display to OFF based on the sensed position of the camera mounting, such as the lift-gate being ajar. Alternatively, the camera or display may perform analytics on the video image (such as via image processing of image data captured by the camera) to determine if the captured scene or field of view is appropriate for that camera. If the field of the view of the camera is determined to be not appropriate, the display may be disabled.

The display device may also be controlled or operable in response to an input or signal, such as a signal received from one or more cameras or image sensors of the vehicle, such as a video camera or sensor, such as a CMOS imaging array sensor, a CCD sensor or the like, and image processors or image processing techniques, such as utilizing aspects of the cameras and image processors described U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, and/or U.S. Pat. Pub. Nos. US-2006-0171704; US-2009-0244361 and/or US-2010-0214791, and/or International Publication Nos. WO 2009/046268 and/or WO 2009/036176, which are all hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle. It is envisioned that an image processor or controller (such as an EyeQ™ image processing chip available from Mobileye Vision Technologies Ltd. of Jerusalem, Israel, and such as an image processor of the types described in International Pub. No. WO/2010/099416, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing.

Optionally, the full display mirror may comprise a fixed reflectance or non-electro-optic reflective element, such as a prismatic reflective element or a flat or planar glass reflective element or the like, with a transflective mirror reflector disposed at one surface of the reflective element. The reflective element may comprise a thin chrome layer and may comprise a dielectric mirror that is transparent and reflective, such as, for example, at least about 35 percent reflective (such as, for example, about 42 percent reflective or thereabouts). Optionally, the second surface of the LCD display screen may comprise a reflector to enhance reflectance of the mirror reflective element. Optionally, the front glass at the LCD display screen may comprise gorilla glass or other suitably durable and thin and strong glass substrate.

Figure 13:
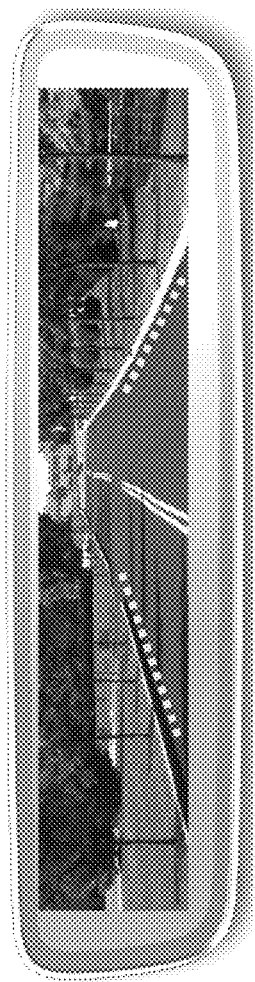
Figure 14:
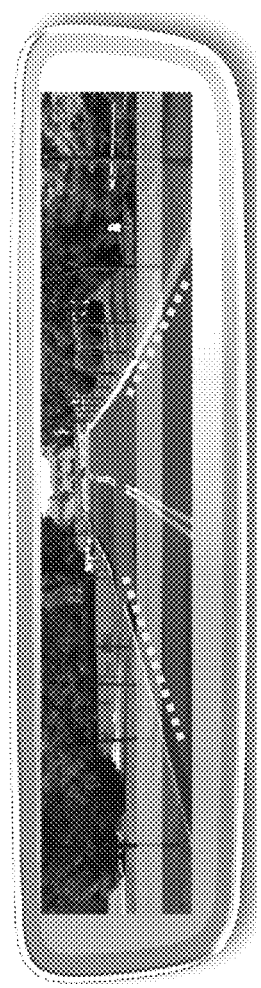
Figure 15:
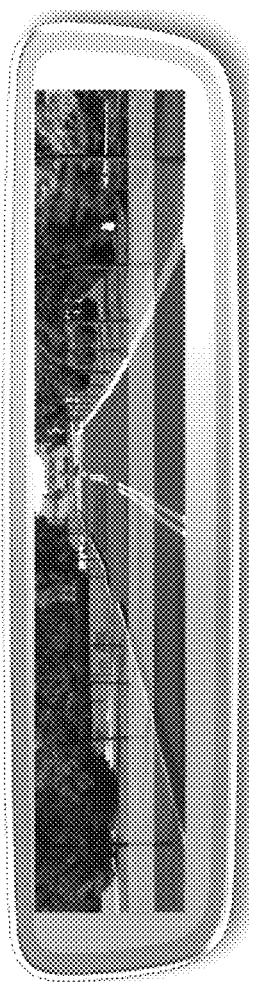

Optionally, the display screen or display system may provide graphic overlays at the displayed images to enhance the viewer's understanding of the displayed images, such as to overlay or shade displayed images to highlight features or distances from the vehicle. Optionally, graphic overlays, such as in the form of horizontal lines or shading or the like, may be provided to represent distance from the vehicle's bumper to various locations rearward of the vehicle, such as shown in FIGS. 11, 12, 14 and 15. Optionally, graphic overlays in the form of angled lines may be provided to show reference for the sides of the vehicle and where the sides of the vehicle would be along the projected rearward path or trajectory of the vehicle, such as shown in FIGS. 13-15. The graphic overlays may comprise static overlays or may comprise dynamic overlays, where the overlays are adjusted responsive to a steering angle of the vehicle or the like.

Because the display screen may be active for prolonged periods of time, the mirror head and/or display screen or module preferably includes heat dissipating means, such as a heatsink or the like. Optionally, the housing may comprise a heat reducing or heat dissipating material, such as aluminum, plastic and/or magnesium or the like. In addition, the mounting bracket to the windscreen or windshield may be thermally connected, in order to increase the heat dissipation from the module.

Figure 16:
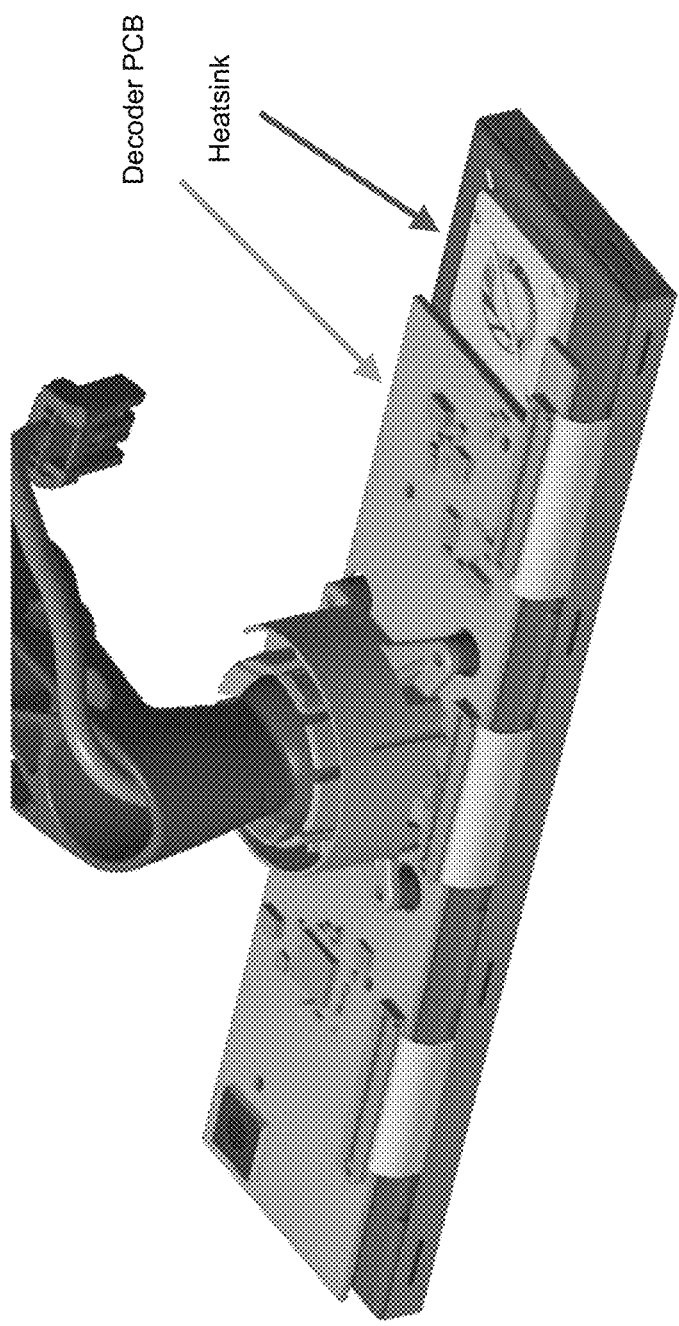
FIG. 16 is a perspective view of a mirror assembly and display screen with a heatsink in accordance with the present invention.
Figure 17:
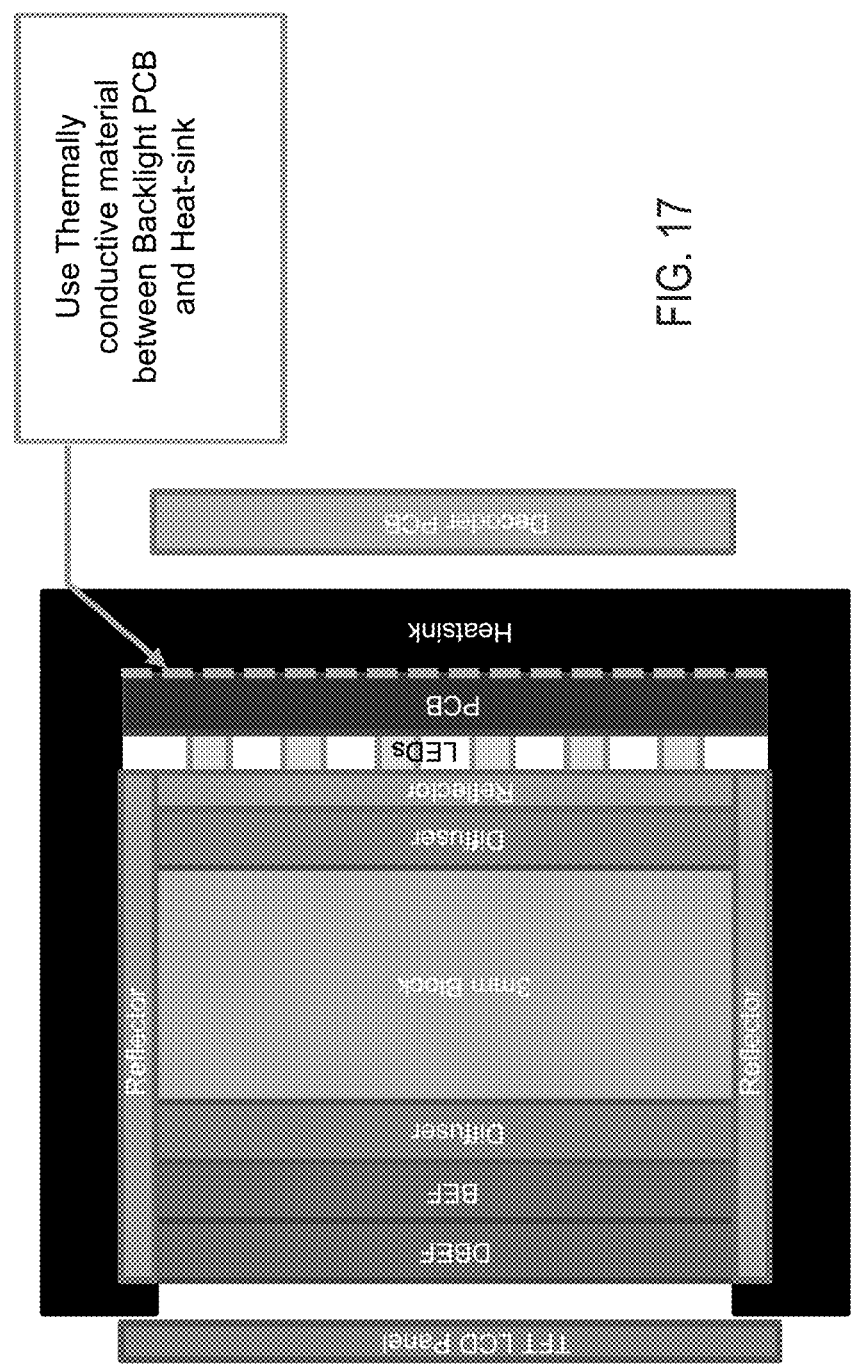
FIG. 17 is a sectional view of a mirror display screen of the present invention, showing use of a heatsink and thermally conductive material between the backlighting PCB and the heatsink.
Figure 18:
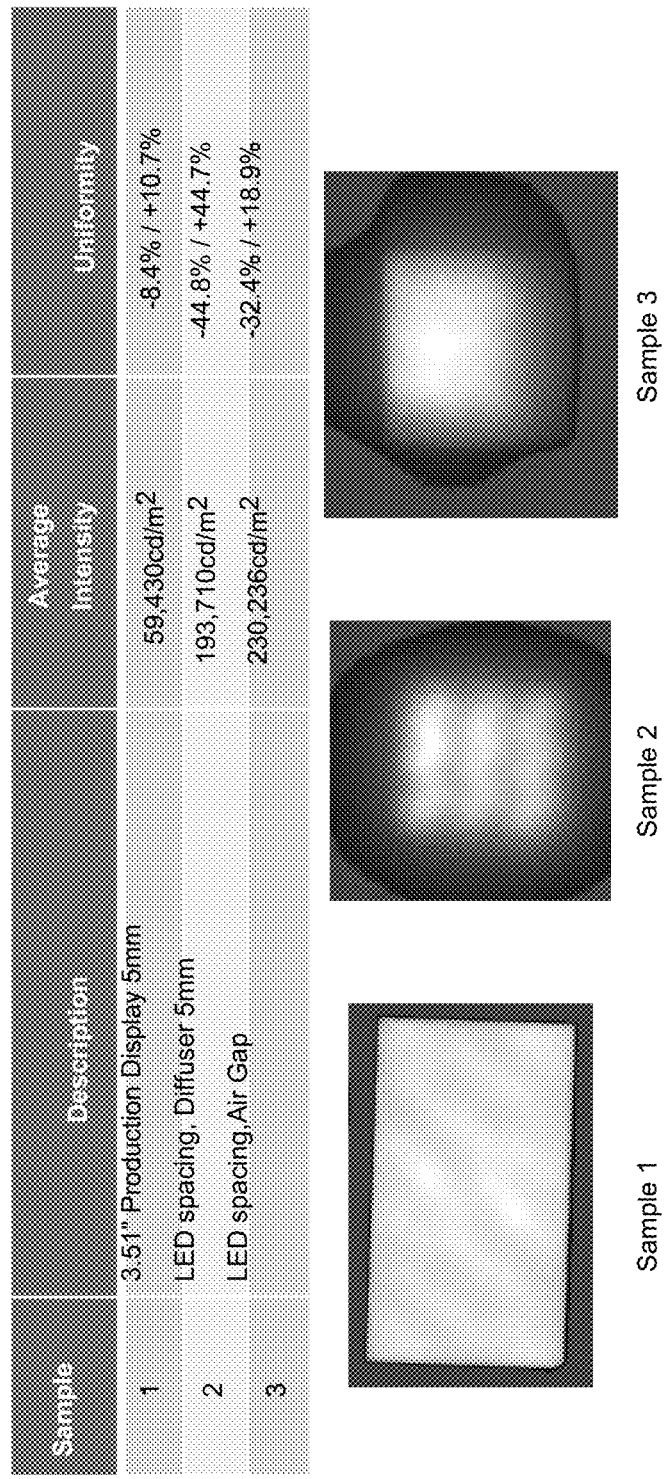
FIG. 18 is a table showing average intensity and uniformity for different sample displays.

As shown in FIG. 16, the display module may include a heatsink at or near the decoder PCB. For example, the heatsink may comprise a plate or structure or element that is disposed along or over a surface of the decoder PCB. Optionally, the display module may comprise additional heat dissipating means or enhancements, such as use of a thermal insulating coating or tape, such as a ceramic "doped" paint or the like, to limit or substantially preclude heat transfer from a heatsink to the decoder PCB of the display module. For example, such a thermal insulating coating or paint may be applied over the entire heatsink or smaller areas to protect sensitive components on the decoder PCB. Optionally, use of a thermally conducting compound or tape, such as an elastomer or resilient material, may be used to thermally connect or couple the decoder PCB to the heatsink, so as to provide enhanced heat transfer from components of the decoder PCB to the heatsink. For example, and such as can be seen with reference to FIG. 17, a gap pad or thermal interface material may be provided between the heatsink and decoder PCB to enhance such heat transfer.

Figure 19:
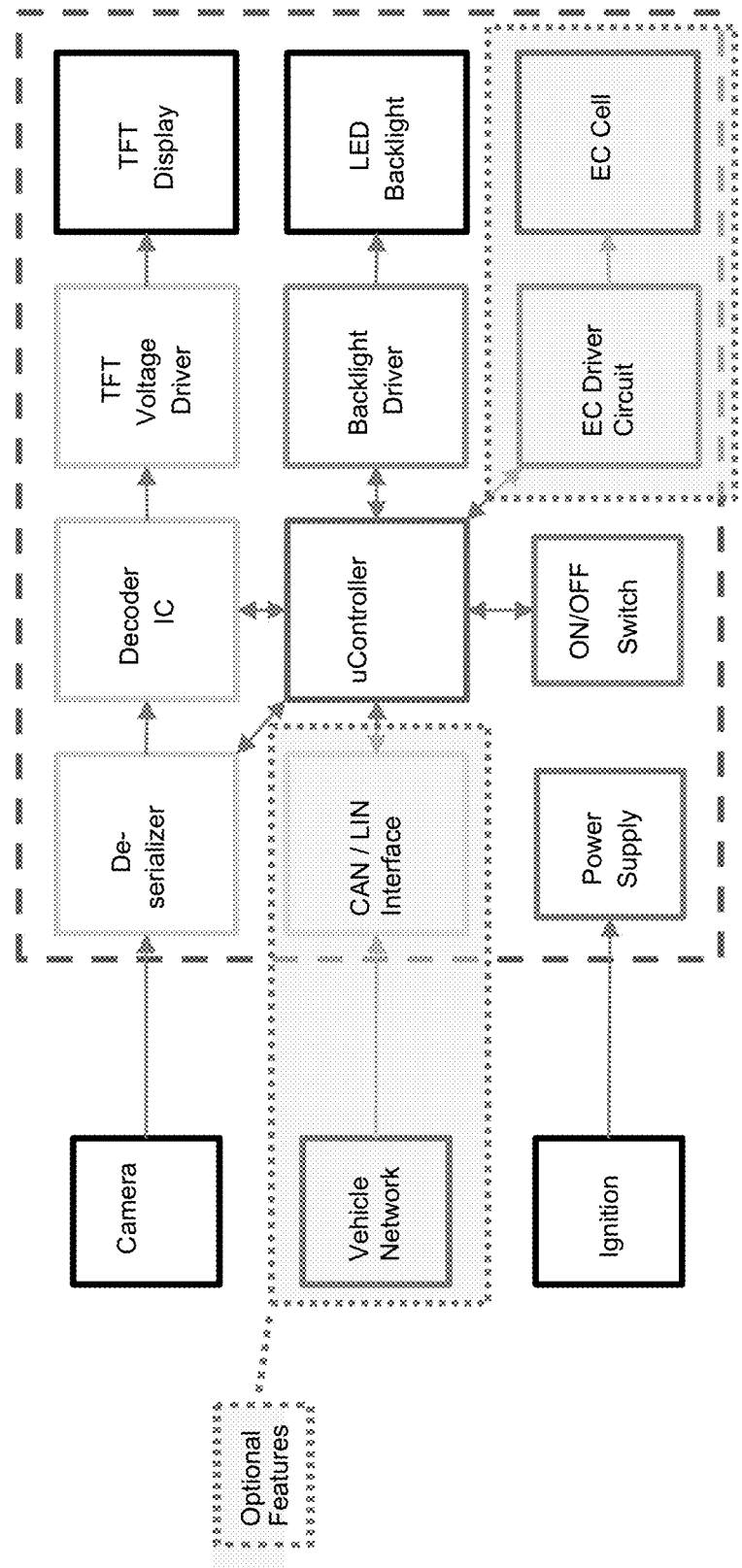
FIG. 19 is a block diagram showing digital video transmission in accordance with the present invention.

Optionally, and with reference to FIG. 19, image data captured by a camera at the vehicle is transmitted to a deserializer and then to a decoder and a TFT voltage driver and then to the TFT display. A controller is responsive to the deserializer and decoder (and a user input or on/off switch) and controls the backlight driver and LED backlighting at the TFT display. Optionally, the controller may also be responsive to or in communication with a vehicle network or CAN or LIN communication bus interface. Optionally, the controller may also control the EC drive circuit to control the dimming of the electro-optic or electrochromic mirror reflective element (so that the control may undim the reflective element when the display is operating to enhance viewing of the display through the mirror reflective element).

Figure 10:
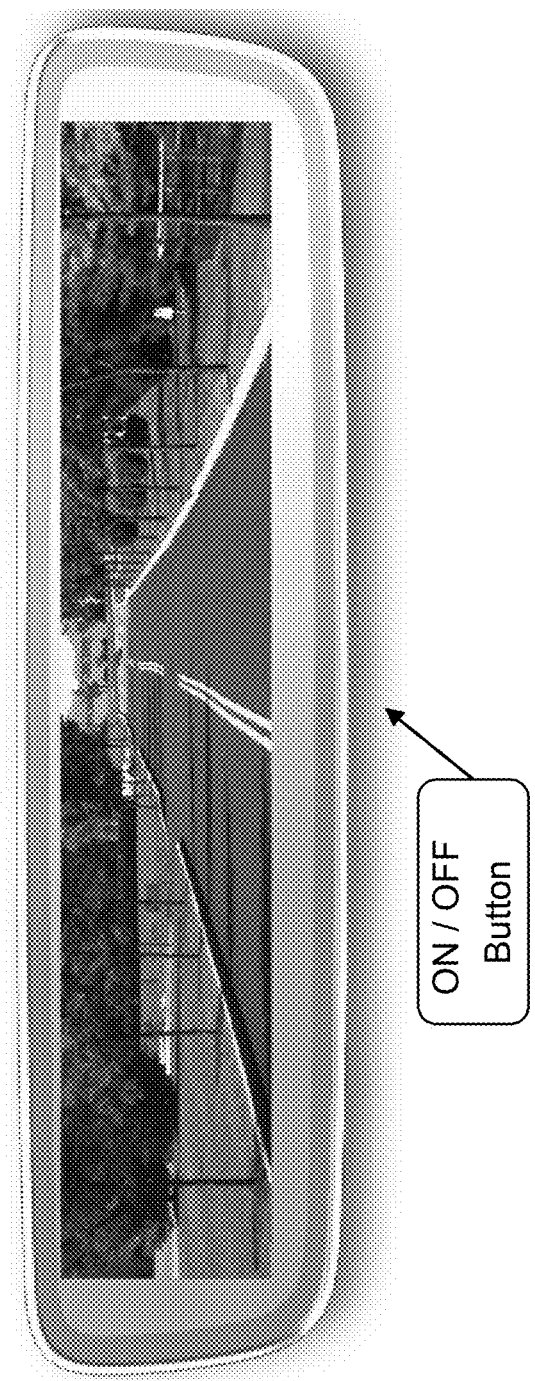
FIG. 10 is a plan view of an interior rearview mirror assembly having a full screen display in accordance with the present invention.
Figure 11:
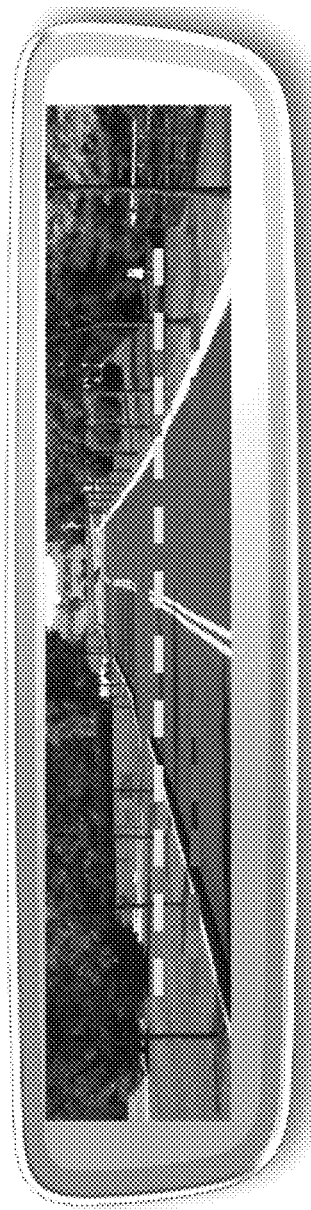
FIGS. 11-15 are plan views of other interior rearview mirror assemblies having full screen displays and using graphic overlays in accordance with the present invention.
Figure 12:
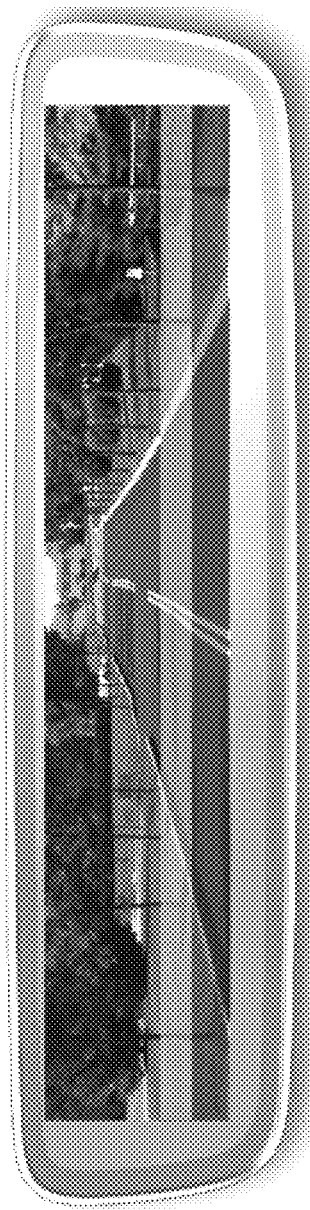

The mirror assembly may also include user actuatable inputs operable to control any of the accessories of or associated with the mirror assembly and/or an accessory module or the like. As shown in FIGS. 2, 3 and 10, the mirror assembly 10 may include a button or user input for actuating the display device 16. The user input may incorporate one or more touch or proximity sensitive user inputs and associated icons or the like so a user can readily identify the purpose or function of the user inputs and actuate the appropriate or desired or selected user input. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or International Publication Nos. WO 2012/051500 and/or WO 2013/071070, which are hereby incorporated herein by reference in their entireties, or such as proximity sensors of the types described in U.S. Pat. Nos. 7,224,324; 7,249,860 and/or 7,446,924, and/or International Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and/or 6,369,804, which are hereby incorporated herein by reference in their entireties, and/or the like, while remaining within the spirit and scope of the present invention.

Optionally, the user inputs or buttons may comprise user inputs for a garage door opening system, such as a vehicle based garage door opening system of the types described in U.S. Pat. Nos. 6,396,408; 6,362,771; 7,023,322 and/or 5,798,688, which are hereby incorporated herein by reference in their entireties. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; 6,946,978; 7,308,341; 7,167,796; 7,004,593; 7,657,052 and/or 6,678,614, and/or U.S. Pat. Pub. No. US-2006-0050018, which are all hereby incorporated herein by reference in their entireties. Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, which are hereby incorporated herein by reference in their entireties.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633,423; D633,019; D638,761 and/or D647,017, and/or International Publication Nos. WO 2010/124064; WO 2011/044312; WO 2012/051500; WO 2013/071070 and/or WO 2013/126719, which are hereby incorporated herein by reference in their entireties (and with electrochromic and prismatic mirrors of such construction are commercially available from the assignee of this application under the trade name INFINITY™ mirror).

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Although shown as an electrochromic mirror application, it is envisioned that the mirror assembly may comprise a prismatic or flat glass reflective element, while remaining within the spirit and scope of the present invention. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. Optionally, for example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the present invention.

Optionally, the reflective element may include an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190 and/or 7,255,451, and/or International Publication Nos. WO 2010/124064 and/or WO 2011/044312, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, microphones, such as disclosed in U.S. Pat. Nos. 7,657,052; 6,243,003; 6,278,377 and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720,580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 7,526,103; 6,690,268 and/or 6,847,487, and/or U.S. Pat. Pub. No. US-2006-0125919, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or an ONSTAR® system, a compass, such as disclosed in U.S. Pat. Nos. 5,924,212; 4,862,594; 4,937,945; 5,131,154; 5,255,442 and/or 5,632,092, and/or any other accessory or circuitry or the like (with all of the above-referenced patents and publications being commonly assigned and being hereby incorporated herein by reference in their entireties).

Optionally, the accessory or accessories, such as those described above, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:
a mirror head pivotable about a mirror support configured to attach at an interior portion of a vehicle equipped with said interior rearview mirror assembly;
wherein said mirror head comprises a mirror reflective element;
wherein said mirror reflective element comprises an electro-optic mirror reflective element having a front substrate and a rear substrate with an electro-optic medium disposed therebetween, and wherein said front substrate has a first surface and a second surface and said rear substrate has a third surface and a fourth surface, said second surface and said third surface opposing said electro-optic medium;

wherein a transflective mirror reflector is disposed at said third surface, and wherein said transflective mirror reflector at least partially reflects light incident thereon and at least partially transmits incident light therethrough;

wherein said electro-optic mirror reflective element comprises a reflective region defined by said transflective mirror reflector;

a video display device disposed rearward of said reflective region of said electro-optic mirror reflective element;

wherein said video display device comprises a display screen that occupies at least 75 percent of said reflective region of said electro-optic mirror reflective element;

wherein said video display device comprises a backlighting array of light emitting diodes for backlighting said display screen;

wherein said electro-optic mirror reflective element comprises an overhang region where a cross dimension of said front substrate is greater than a corresponding cross dimension of said rear substrate;

a light sensor disposed at the overhang region, wherein said light sensor senses light levels at said interior rearview mirror assembly, and wherein said light sensor is disposed behind said front substrate and below said video display device, and wherein said light sensor senses light that passes through said front substrate of said electro-optic mirror reflective element at the overhang region, and wherein the light that passes through said front substrate at the overhang region does not pass through said electro-optic medium of said electro-optic mirror reflective element;

wherein said light sensor is integrated with a user input that is configured to actuate at the overhang region of said electro-optic mirror reflective element;

wherein, with said mirror support attached at the interior portion of the equipped vehicle, said video display device is operable to display video images captured by a rearward viewing camera of the equipped vehicle;

wherein, with said mirror support attached at the interior portion of the equipped vehicle, and when said video display device is operated to display video images, light emitted by said video display device passes through said transflective mirror reflector of said electro-optic mirror reflective element for viewing of displayed video images by a driver of the equipped vehicle viewing said electro-optic mirror reflective element;

wherein said video display device is operated responsive at least in part to actuation by a user of the user input; and wherein, with said mirror support attached at the interior portion of the equipped vehicle, electro-optic dimming of said electro-optic mirror reflective element and/or display intensity of said video display device is variable responsive to a light level detected by said light sensor to enhance visibility of displayed images at an electro-optically active region of said electro-optic mirror reflective element.

2. The interior rearview mirror assembly of claim 1, wherein said backlighting array of light emitting diodes of said video display device has at least two dimming ranges configured to increase the overall range of illumination intensity of said backlighting array of light emitting diodes.

3. The interior rearview mirror assembly of claim 1, wherein said user input is configured to actuate based on a touch event at said first surface of said front substrate at the overhang region of said electro-optic mirror reflective element.

4. The interior rearview mirror assembly of claim 1, wherein said video display device comprises a video processor that increases background image luminance to limit viewability of reflected images at said reflective region of said mirror reflective element.

5. The interior rearview mirror assembly of claim 1, wherein said display screen of said video display device comprises an array of pixels that includes a plurality of sub-arrays of pixels having red, green, blue and clear pixels.

6. The interior rearview mirror assembly of claim 5, wherein said video display device is operable to display images using clear pixels to provide a brighter displayed image, and wherein said video display device is operable to display images without using clear pixels to reduce the brightness of the displayed images.

7. The interior rearview mirror assembly of claim 6, wherein said video display device is operable to display images without using clear pixels responsive to a determination of night-time driving conditions.

8. The interior rearview mirror assembly of claim 1, wherein, with said mirror support attached at the interior portion of the equipped vehicle, said video display device changes from displaying color images to displaying black and white images responsive to a determination of night-time driving conditions.

9. The interior rearview mirror assembly of claim 1, wherein said backlighting array of light emitting diodes comprises a plurality of zones of light emitting diodes, and wherein each zone of said plurality of zones of light emitting diodes comprises at least two light emitting diodes, and wherein said zones of light emitting diodes backlight respective regions of said video display device, and wherein, with said mirror support attached at the interior portion of the equipped vehicle, the regions of said video display device display respective areas in the rearward field of view of said rearward viewing camera.

10. The interior rearview mirror assembly of claim 9, wherein, with said mirror support attached at the interior portion of the equipped vehicle, said zones of light emitting diodes are independently controlled based on the video images being displayed at the respective regions by said video display device.

11. The interior rearview mirror assembly of claim 9, wherein, with said mirror support attached at the interior portion of the equipped vehicle, at least one zone of said plurality of zones of light emitting diodes is controlled responsive to a determination, via said light sensor, of a glare source being present at the area in the rearward field of view of said rearward viewing camera that is being displayed at the region of said video display device that is backlit by said at least one zone of said plurality of zones of light emitting diodes.

12. The interior rearview mirror assembly of claim 9, wherein, with said mirror support attached at the interior portion of the equipped vehicle, at least one zone of said plurality of zones of light emitting diodes is controlled responsive to a determination, via said light sensor, of a headlight of a rear-approaching vehicle being present at the area in the rearward field of view of said rearward viewing camera that is being displayed at the region of said video display device that is backlit by said at least one zone of said plurality of zones of light emitting diodes.

13. The interior rearview mirror assembly of claim 9, wherein, with said mirror support attached at the interior portion of the equipped vehicle, at least one zone of said plurality of zones of light emitting diodes backlights an upper region of said display screen, and wherein said at least one zone is dimmed to reduce the display intensity of a sky region of the displayed video images.

14. An interior rearview mirror assembly for a vehicle, said interior rearview mirror assembly comprising:
- a mirror head pivotable about a mirror support configured to attach at an interior portion of a vehicle equipped with said interior rearview mirror assembly;
- wherein said mirror head comprises a mirror reflective element;
- wherein said mirror reflective element comprises an electro-optic mirror reflective element having a front substrate and a rear substrate with an electro-optic medium disposed therebetween, and wherein said front substrate has a first surface and a second surface and said rear substrate has a third surface and a fourth surface, said second surface and said third surface opposing said electro-optic medium;
- wherein a transflective mirror reflector is disposed at said third surface, and wherein said transflective mirror reflector at least partially reflects light incident thereon and at least partially transmits incident light therethrough;
- wherein said electro-optic mirror reflective element comprises a reflective region defined by said transflective mirror reflector;
- a video display device disposed rearward of said reflective region of said electro-optic mirror reflective element;
- wherein said video display device comprises a display screen that occupies at least 75 percent of said reflective region of said electro-optic mirror reflective element;
- wherein said video display device comprises a backlighting array of light emitting diodes for backlighting said display screen;
- wherein said electro-optic mirror reflective element comprises an overhang region where a cross dimension of said front substrate is greater than a corresponding cross dimension of said rear substrate;
- a light sensor disposed at the overhang region, wherein said light sensor senses light levels at said interior rearview mirror assembly, and wherein said light sensor is disposed behind said front substrate and below said video display device, and wherein said light sensor senses light that passes through said front substrate of said electro-optic mirror reflective element at the overhang region, and wherein the light that passes through said front substrate at the overhang region does not pass through said electro-optic medium of said electro-optic mirror reflective element;
- wherein said light sensor is integrated with a user input that is configured to actuate at the overhang region of said electro-optic mirror reflective element;
- wherein said user input is configured to actuate based on a touch event at said first surface of said front substrate at the overhang region of said electro-optic mirror reflective element;
- wherein said video display device is operated to display video images captured by a rearward viewing camera of the vehicle;
- wherein, when said video display device is operated to display video images, light emitted by said video display device passes through said transflective mirror reflector of said electro-optic mirror reflective element for viewing of displayed video images by a driver of the vehicle viewing said electro-optic mirror reflective element;
- wherein said video display device is operated responsive at least in part to actuation by a user of the user input; and
- wherein, with said mirror support attached at the interior portion of the equipped vehicle, at least some of said light emitting diodes of said video display device are controlled responsive to a determination, via said light sensor, of a glare source being present at the area in the rearward field of view of said rearward viewing camera that is being displayed at a region of said video display device that is backlit by said at least some of said light emitting diodes.

15. The interior rearview mirror assembly of claim 14, wherein said backlighting array of light emitting diodes of said video display device has at least two dimming ranges configured to increase the overall range of illumination intensity of said backlighting array of light emitting diodes.

16. The interior rearview mirror assembly of claim 14, wherein, with said mirror support attached at the interior portion of the equipped vehicle, said video display device changes from displaying color images to displaying black and white images responsive to a determination of nighttime driving conditions.

17. The interior rearview mirror assembly of claim 14, wherein, with said mirror support attached at the interior portion of the equipped vehicle, said light emitting diodes are controlled based on the video images being displayed at respective regions backlit by said light emitting diodes of said video display device.

18. An interior rearview mirror assembly for a vehicle, said interior rearview mirror assembly comprising:
- a mirror head pivotable about a mirror support configured to attach at an interior portion of a vehicle equipped with said interior rearview mirror assembly;
- wherein said mirror head comprises a mirror reflective element;
- wherein said mirror reflective element comprises an electro-optic mirror reflective element having a front substrate and a rear substrate with an electro-optic medium disposed therebetween, and wherein said front substrate has a first surface and a second surface and said rear substrate has a third surface and a fourth surface, said second surface and said third surface opposing said electro-optic medium;
- wherein a transflective mirror reflector is disposed at said third surface, and wherein said transflective mirror reflector at least partially reflects light incident thereon and at least partially transmits incident light therethrough;
- wherein said electro-optic mirror reflective element comprises a reflective region defined by said transflective mirror reflector;
- a video display device disposed rearward of said reflective region of said electro-optic mirror reflective element;
- wherein said video display device comprises a display screen that occupies at least 75 percent of said reflective region of said electro-optic mirror reflective element;
- wherein said video display device comprises a backlighting array of light emitting diodes for backlighting said display screen;
- wherein said electro-optic mirror reflective element comprises an overhang region where a cross dimension of said front substrate is greater than a corresponding cross dimension of said rear substrate;

a light sensor disposed at the overhang region, wherein said light sensor senses light levels at said interior rearview mirror assembly, and wherein said light sensor is disposed behind said front substrate and below said video display device, and wherein said light sensor senses light that passes through said front substrate of said electro-optic mirror reflective element at the overhang region, and wherein the light that passes through said front substrate at the overhang region does not pass through said electro-optic medium of said electro-optic mirror reflective element;

wherein said light sensor is integrated with a user input that is configured to actuate at the overhang region of said electro-optic mirror reflective element;

wherein said user input is configured to actuate based on a touch event at said first surface of said front substrate at the overhang region of said electro-optic mirror reflective element;

wherein, with said mirror support attached at the interior portion of the equipped vehicle, said video display device is operable to display video images captured by a rearward viewing camera of the equipped vehicle;

wherein said display screen of said video display device comprises an array of pixels that includes a plurality of sub-arrays of pixels having red, green, blue and clear pixels;

wherein, with said mirror support attached at the interior portion of the equipped vehicle, and when said video display device is operated to display video images, light emitted by said video display device passes through said transflective mirror reflector of said electro-optic mirror reflective element for viewing of displayed video images by a driver of the equipped vehicle viewing said electro-optic mirror reflective element;

wherein said video display device is operated responsive at least in part to actuation by a user of the user input; and wherein said video display device is operable to display images using clear pixels to provide a brighter displayed image, and wherein said video display device is operable to display images without using clear pixels to reduce the brightness of the displayed images.

19. The interior rearview mirror assembly of claim 18, wherein said video display device comprises a video processor that increases background image luminance to limit viewability of reflected images at said reflective region of said mirror reflective element.

20. The interior rearview mirror assembly of claim 18, wherein, with said mirror support attached at the interior portion of the equipped vehicle, said video display device is operable to display images without using clear pixels responsive to a determination of night-time driving conditions.

* * * * *